United States Patent
Cripe

(10) Patent No.: US 7,308,835 B2
(45) Date of Patent: Dec. 18, 2007

(54) REDUCTION OF HYSTERESIS IN A MAGNETOELASTIC TORQUE SENSOR

(75) Inventor: David W. Cripe, Williamsburg, VA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 183 days.

(21) Appl. No.: 11/232,602

(22) Filed: Sep. 22, 2005

(65) Prior Publication Data

US 2007/0062311 A1    Mar. 22, 2007

(51) Int. Cl.
*G01L 3/10* (2006.01)
(52) U.S. Cl. ................................. 73/862.333
(58) Field of Classification Search .......... 73/862.333, 73/862.335, 862.336
See application file for complete search history.

(56) References Cited

U.S. PATENT DOCUMENTS

| | | | |
|---|---|---|---|
| 4,760,745 A * | 8/1988 | Garshelis | ............... 73/862.333 |
| 5,520,059 A * | 5/1996 | Garshelis | ............... 73/862.335 |
| 5,696,575 A | 12/1997 | Kohnen et al. | |
| 5,889,215 A | 3/1999 | Kilmartin et al. | |
| 5,939,881 A | 8/1999 | Slater et al. | |
| 6,145,387 A | 11/2000 | Garshelis | |
| 6,222,363 B1 | 4/2001 | Cripe | |
| 6,298,467 B1 | 10/2001 | Chuang et al. | |
| 6,300,855 B1 | 10/2001 | Clark et al. | |
| 6,341,534 B1 * | 1/2002 | Dombrowski | .......... 73/862.333 |
| 6,348,812 B1 | 2/2002 | May et al. | |
| 6,467,360 B1 * | 10/2002 | Bogdanov | ............... 73/862.333 |
| 6,516,508 B1 | 2/2003 | Gandarillas | |
| 6,698,299 B2 | 3/2004 | Cripe | |

OTHER PUBLICATIONS

I. J. Garshelis and C. R. Conto. "A magnetoelastic torque transducer utilizing a ring divided into two oppositely polarized circumferential regions." J. Appl. Phys. 79, (1996) pp. 4756-4758.*

* cited by examiner

*Primary Examiner*—Harshad Patel
*Assistant Examiner*—Punam Patel

(57) ABSTRACT

A torque sensor assembly includes a reduced hysteresis by imparting a magnetoelastic ring with a first remnant magnetic field and a second remnant magnetic field that are disposed in opposite orientations. The first and second magnetic fields are spaced apart such that a third magnetic field is created within the magnetoelastic ring. The third magnetic field is a loosely pinned magnetic domain that imparts a negative hysteresis within the magnetoelastic ring. The negative hysteresis imparted to the magnetoelastic ring provides for the countering of positive hysteresis created by the application of torque.

14 Claims, 3 Drawing Sheets

REDUCTION OF HYSTERESIS IN A MAGNETOELASTIC TORQUE SENSOR

BACKGROUND OF THE INVENTION

This invention is generally related to a method and device for fabricating a magnetoelastic torque sensor. More particularly, this invention is related to a method and device for reducing magnetic hysteresis in a magnetoelastic torque sensor.

A magnetoelastic torque sensor utilizes the Inverse-Wiedmann Effect that generates a magnetic field in a magnetoelastic material responsive to the application of torque. A magnetoelastic torque sensor includes a substrate that bears an applied torque and that supports a band of magnetoelastic material. The magnetoelastic band is imparted with a circumferential stress that provides a magnetic easy axis that in turn provides a desired circumferential magnetic field within the magnetoelastic band. Torque on the substrate is transmitted to the band of magnetoelastic material to induce a distortion in the circumferential orientation of the magnetic field. The torque applied to the substrate causes the normally circumferentially orientated magnetic field to become distorted such that the magnetic field is helically shaped. The distortion away from the circumferential direction is measured by a magnetic field detection device. The magnitude and amplitude of the distortion corresponds to the torque applied to the substrate.

Disadvantageously, in some instances the magnetic field does not return to the desired circumferential orientation once torque is released. The remnant axial components of the magnetic field can cause a shift in the zero point known as hysteresis. At least a portion of the zero shift is caused by smaller than desired circumferential stress in the magnetoelastic band and a undesirably high magnetocrystalline anisotropy in the magnetoelastic material. Material properties of the magnetoelastic material are selected for compatibility with a specific application and in some instances materials may be selected and utilized that do not limit hysteresis.

Accordingly, it is desirable to develop a method and device that accommodates undesirable hysteresis effects in a magnetoelastic material and provides an economically favorable utilization of materials.

SUMMARY OF THE INVENTION

An example method of fabricating a torque sensor according to this invention includes the step of supporting a magnetoelastic material on a substrate and imparting a first circumferential magnetic field within the magnetoelastic material in a first desired direction. A second circumferential magnetic field is imparted in the magnetic material in a second direction opposite from the first direction and is spaced apart from the first circumferential magnetic field.

The example method according to this invention provides for the imparting of an adjacent negative hysteretic structure within the magnetoelastic material. The negative hysteretic structure that is built into the magnetoelastic material counters positive hysteresis that is imparted in the magnetoelastic material from the application of torque.

An example torque transducer according to this invention is imparted with circumferential magnetic remnants by rotating the magnetic material band in the proximity of a permanent magnet. Two permanent magnets are utilized, each imparting a magnetic field of an opposite direction. The imparting of an opposite magnetic field within the magnetoelastic material provides a magnetic dipole structure that allows discrimination of torque related magnetic fields from non-divergent fields proximate to the torque sensor.

The first and second permanent magnets utilized to impart the preferential circumferential magnetic fields in the magnetoelastic material are spaced an axial distance from each other. By spacing the permanent magnets an axial distance from each other the first and second magnetic remnant fields are also spaced a desired axial distance from each other. The space between the first and second magnetic fields is imparted with a band of a weak magnetic field having no specific direction. The weak magnetic field disposed between the first and second fields includes an orientation that is neither in the direction of the first or the second magnetic fields and that is much weaker. This spacing imparts the intrinsic negative hysteresis within the magnetoelastic material that counters positive hysteresis imparted by the application of torque.

Accordingly, the method and device according to this device utilizes hysteretic effects imparted into the magnetoelastic material to accommodate and counter undesirable hysteresis imparted within the torque transducer due to the application of torque.

These and other features of the present invention can be best understood from the following specification and drawings, the following of which is a brief description.

DETAILED DESCRIPTION OF THE PREFERRED EMBODIMENT

Figure 1:
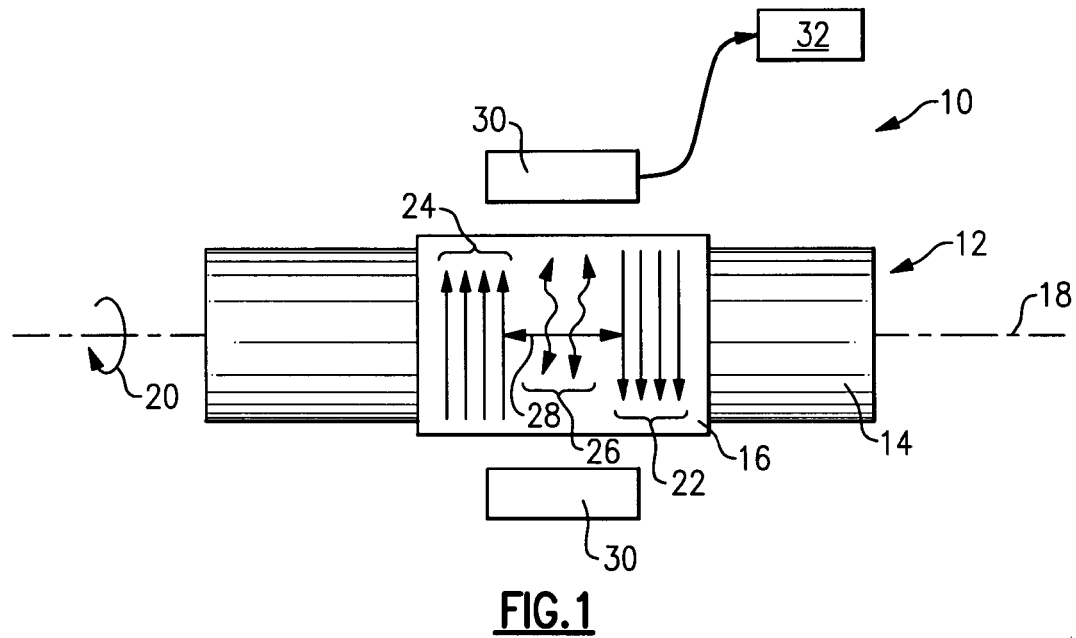
FIG. 1 is a schematic illustration of a torque transducer according to this invention.

Referring to FIG. 1, a torque sensor assembly 10 is schematically shown and includes a torque transducer 12 comprising a shaft 14 supporting a magnetoelastic ring 16. The shaft 14 includes an axis 18 and is adapted to receive an applied torque schematically indicated at 20. The torque transducer 12 includes the magnetoelastic ring 16. Within the magnetoelastic ring 16 are preferentially orientated remnant magnetic fields. These preferentially remanent magnetic fields are disposed in a circumferential orientation. During the application of torque, the preferential circumferential magnetic fields are distorted in a helical direction and become imparted with an axial magnetic component.

The axial magnetic component imparted on the torque transducer 12 is measured by magnetic field vector sensors 30. The magnitude and direction of the axial component of the magnetic fields are measured and provided to a controller 32. The controller 32 translates the vector quantities of the measured magnetic fields and determines an applied torque according to a known relationship.

Upon the release of the applied torque 20, the torque transducer 12 would preferably return to the same zero position as where it had originally begun. However, the torque transducer 12 and particularly the shaft 14 and the magnetoelastic material ring 16 plastically deform to some degree upon each application of torque 20. The plastic deformation along with other phenomenon including the imparting of insufficient circumferential stresses within the magnetoelastic material or an excessively high magnetocrystalline anisotropy of the magnetoelastic material combine to cause a hysteresis effect. This hysteresis effect results in a shift of a zero point. Shifting of the zero point results in undesirably torque readings as the measured torque value never returns to the original zero position.

A shift in the zero point of the torque transducer 12 in the same direction as that of the applied torque 20 is referred to as positive hysteresis. The positive hysteresis causes the sensor to return to a value that is greater than the original zero value. The torque sensor 10 according to this invention includes the torque transducer 12 that is imparted with a negative hysteresis within the magnetoelastic ring 16. The negative hysteresis is imparted to such a magnitude to counteract the results and effects of the positive hysteresis imparted by the application of torque.

The desired negative hysteresis is imparted by and during the imparting of the circumferential magnetic remanent fields within the magnetoelastic material ring 16. Transducer 12 includes the magnetoelastic ring 16 that includes imparted circumferential magnetic fields 22, 24. The first magnetic remanent field 22 is disposed in a first direction. The second magnetic remanent field 24 is disposed in a second direction that is opposite to the first direction. The oppositely disposed circumferential magnetic remnants of the first and second magnetic fields 22, 24 accommodate and provide for discrimination between torque related fields and other proximate magnetic fields.

The first magnetic field remnant 22 and the second magnetic field remnant 24 are spaced an axial distance 28 apart. The axial distance 28 between the first magnetic field remnant 22 and the second magnetic field remnant 24 creates a weak magnetic field that is orientated in neither of the first or the second direction. This weak magnetic field provides the source for negative hysteretic signals which are used to cancel and accommodate the positive hysteresis effects produced during application of torque. A specific axial distance 28 between the first magnetic field remnant 22 and the second magnetic field remnant 24 is application dependent and is determined with regard to specific material properties that comprise the torque transducer 12. Further, the magnitude or quantity of negative hysteresis effect that is desired is adapted by varying the axial distance 28 between the first magnetic field remnant 22 and the second magnetic field remnant 24.

Figure 2:
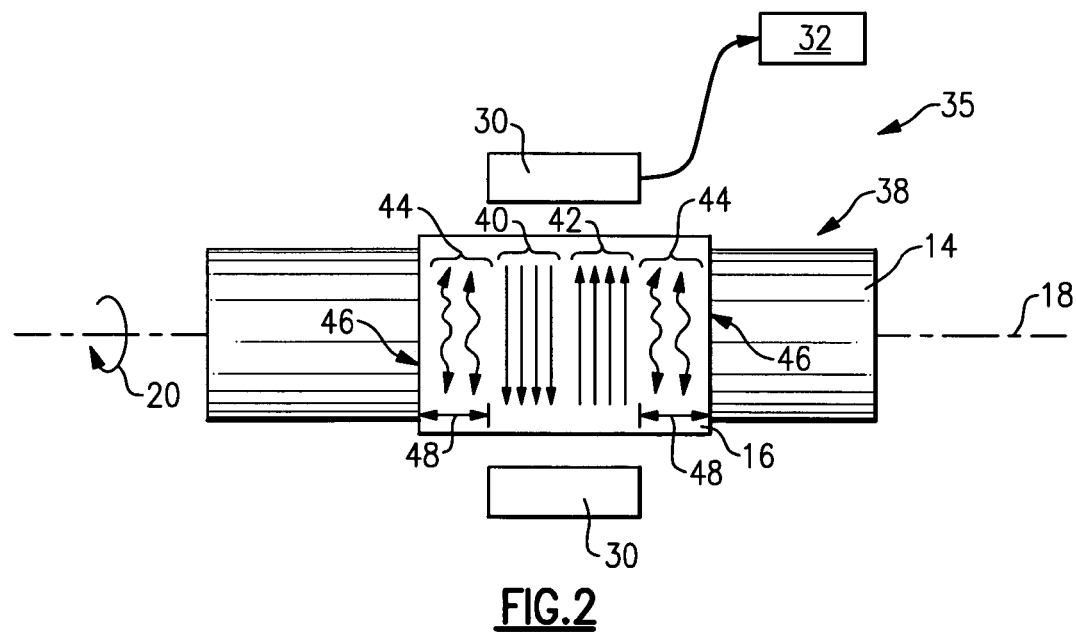
FIG. 2 is another schematic illustration of an example torque transducer according to this invention.

Referring to FIG. 2, another example torque sensor 35 according to this invention includes a torque transducer 38 that includes the shaft 14 and the magnetoelastic ring 16. The magnetoelastic ring 16 includes axial ends 46. In the torque transducer 38 a first magnetic field remanent 40 and a second magnetic field remanent 42 are spaced apart from the axial ends 46 of the magnetoelastic ring 16. The axial distance 48 between the first magnetic field remnant 40 and the second magnetic field remnant 42 and each of the axial ends 46 is not filled with a magnetic field of any orientation related to those of the first magnetic field remnant 40 and the second magnetic field remnant 42. A third magnetic field 44 is generated and produced within the axial distance 48 between each of the first and second magnetic field remnant 40, 42 and the axial ends 46. This third magnetic field 44 is the weak magnetic field that generates the negative hysteresis desired to counter positive hysteresis produced by the application of torque 20.

Figure 3:
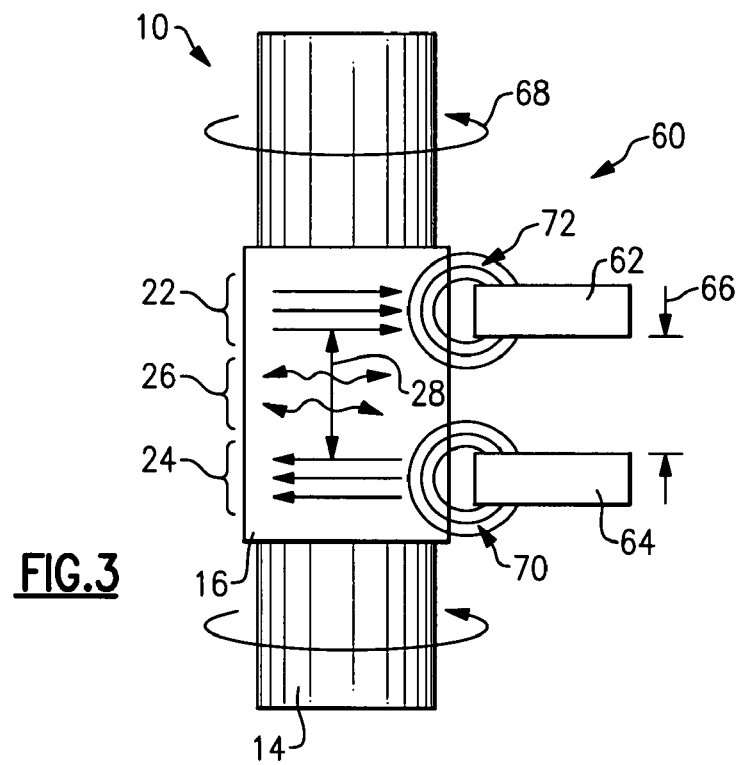
FIG. 3 is a schematic illustration of a method of imparting preferential magnetic fields in a torque transducer according to this invention.

Referring to FIG. 3, a method of fabricating a torque transducer according to this invention is illustrated and generally indicated at 60. The method according to this invention includes the initial step of imparting the first circumferential magnetic field remnant 22 within the magnetoelastic ring 16. The method continues by imparting the second circumferential magnetic field remnant 24 within the magnetoelastic ring 16 in an opposite direction to the first magnetic field remnant 22. The first and second magnetic field remnant 22, 24 are spaced apart the axial distance 28 from each other.

During the imparting of the magnetic fields the torque transducer 12 is rotated in the presence of a first permanent magnet 62 and a second permanent magnet 64. Each of the permanent magnets 62, 64 emit a magnetic field 70, 72 of such a strength as to magnetically saturate the magnetoelastic ring 16 and impart the preferential, circumferentially orientated magnetic remnants fields 22, 24. The distance 66 between the permanent magnet 62 and the second permanent magnet 64 is determined based on the desired strength of the third magnetic field 26 that is disposed within the axial distance between the first magnetic field 22 and the second magnetic field 24. As appreciated, adjusting the axial distance 66 between the permanent magnet 62, 64 results in a change of the axial distance 28 of the circumferential magnetic field remnant 22, 24 disposed within the magnetoelastic ring 16. This axial distance 28 is adjusted to provide the desired countering force to the positive hysteresis developed and originated from application torque to the torque sensor 10.

Figure 4:
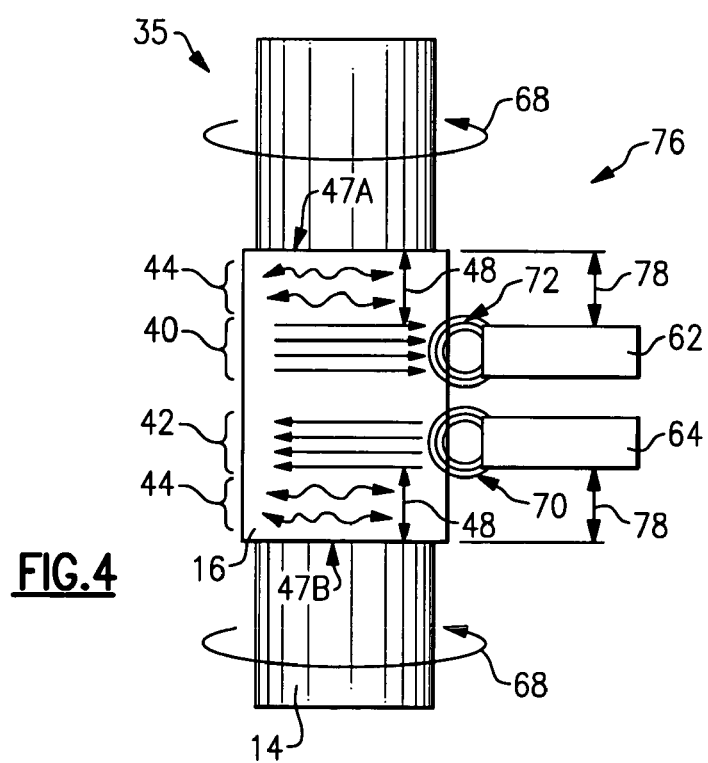
FIG. 4 is another schematic illustration of an example method for imparting preferential magnetic fields within a torque transducer according to this invention.

Referring to FIG. 4, another method of fabricating a torque transducer is generally indicated at 76 and includes the steps of imparting the first magnetic field remnant 40 at the axial distance 48 from an axial end portion 47A of the magnetoelastic ring 16. The method further includes the imparting of a second circumferential magnetic remnant field 42 at the axial distance 48 from a second axial end 47B. Accordingly, the first and second magnetic field remnants 40, 42 are orientated adjacent each other in a central portion of the magnetoelastic ring 16. However, the circumferential magnetic field remnants 40, 42 that are disposed in opposite directions relative to each other do not extend to the axial end portions 47A, 47B of the magnetoelastic rings 16. The third magnetic field 44 is disposed within the space between each of the first and second magnetic field remnants 40, 42 and the corresponding axial end portions 47A, 47B.

During the imparting step, the permanent magnets 62, 64 are spaced an axial distance 78 from the axial ends 47A, 47B. The permanent magnets 62, 64 impart the desired oppositely orientated magnetic field remanent 40, 42. The third magnetic field 44 is disposed between the first and second magnetic field remanent 40, 42 and therefore create the desired negative hysteresis within the magnetoelastic ring 16.

Figure 5:
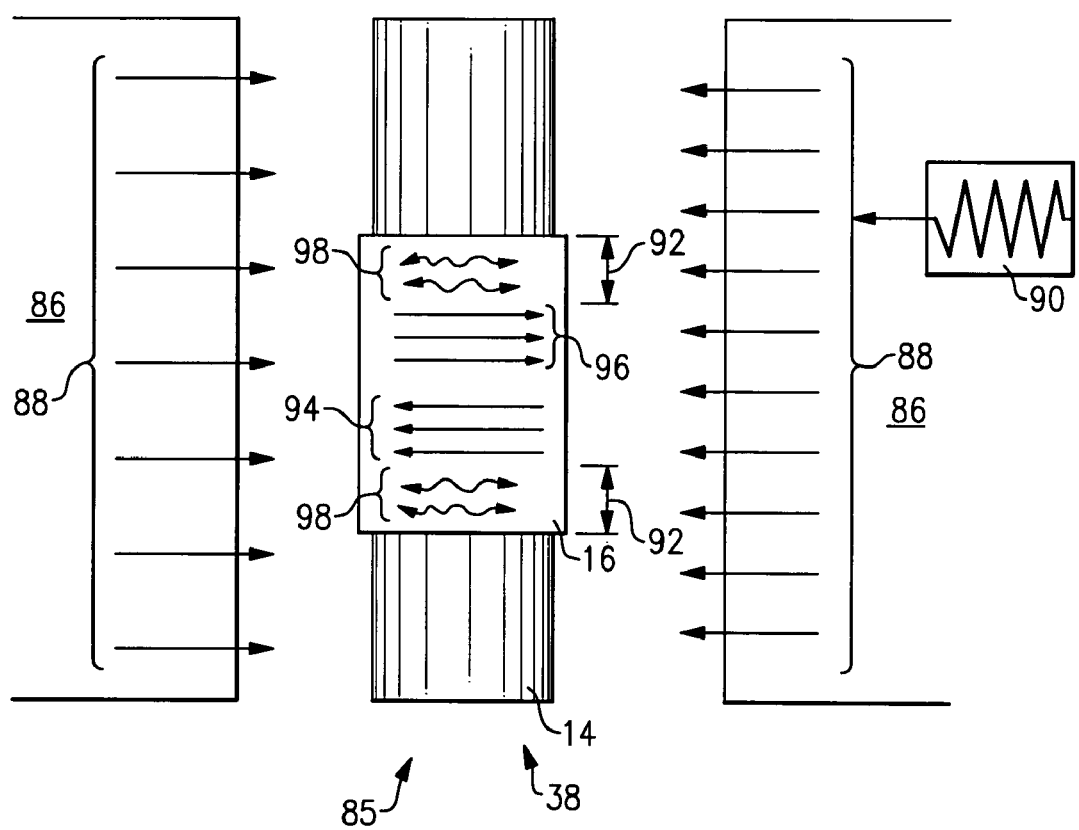
FIG. 5 is yet another example method that is schematically illustrated for imparting preferential and desired magnetic fields to a torque transducer according to this invention.

Referring to FIG. 5, another method according to this invention schematically indicated at 85 and includes the first step of imparting the preferential, circumferential magnetic remanent fields 94, 96 within the magnetoelastic ring 16. The first circumferential magnetic field 94 is disposed in a first circumferential direction and the second circumferentially remanent magnetic field 96 is disposed in a second circumferential direction that is opposite to the first circumferential direction. Once the preferred circumferential orientated magnetic field remanent 94, 96 are imparted within the magnetoelastic ring 16. The entire transducer 38 is exposed to an alternating magnetic field schematically indicated at 88.

The alternating magnetic field 88 is generated by a magnetic field generator 86 that is supplied with an alternating current 90. An alternating magnetic field generator 88 producing an alternating magnetic field 88 is utilized to de-magnetize portions of the torque transducer element 38. Demagnetizing certain portions of the torque transducer element 38 provides and eliminates the circumferential magnetic remnants in portions of the magnetoelastic ring 16. In the method according to this invention, the circumferential magnetic remanences are eliminated by the alternating magnetic field 88 in the axial end portions 92 of the magnetoelastic ring 16.

The resulting torque transducer element 38 includes the third magnetic remanences 98 that is disposed between the first and second magnetic fields 94, 96 and each of the axial ends. The magnetic remanences 98 is not orientated circumferentially and provides the weak magnetic domain that produces the negative hysteresis within the magnetoelastic ring 16. Accordingly, the duration and strength of exposure to the alternating magnetic field 88 will produce varying amounts and magnitudes of the third magnetic remanences 98 within the magnetoelastic ring 16. The magnitude of the third magnetic field 98 is adjusted to provide the desired negative hysteresis imparted within the magnetoelastic ring 16. By adjusting the amount of negative hysteresis within the magnetoelastic ring 16 the amount of positive hysteresis that may be neutralized to provide a more accurate sensor may be adjusted.

Accordingly, the torque sensor fabricated according to this method and including the circumferential magnetic fields disposed within the magnetoelastic ring provides for the accommodation and countering of positive hysteresis by imparting the negative hysteresis during the magnetization process. The countering of positive hysteresis with the negative hysteresis provides for a more accurate torque sensor with a substantially more accurate and reliable measurement.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of fabricating a torque sensor comprising the steps of:
   a) imparting a first circumferential magnetic field within a magnetoelastic band having a first desired magnetic field direction;
   b) imparting a second circumferential magnetic field within the magnetoelastic band in a second desired magnetic field direction opposite the first magnetic field direction;
   c) spacing the first magnetic field an axial distance from the second magnetic field; and
   d) placing the torque sensor within an alternating magnetic field to demagnetize axial regions of the magnetoelastic band.

2. The method as recited in claim 1, wherein said steps a) and b) include rotating the magnetoelastic material in the presence of a magnet of a field strength capable of saturating the magnetoelastic band.

3. The method as recited in claim 1, wherein the spacing between the first magnetic field and the second magnetic field imparts a magnetic remnant having a magnetic field orientation different than the first magnetic field direction and the second magnetic field direction.

4. The method as recited in claim 1, wherein said step c) includes spacing the first circumferential magnetic field and the second circumferential magnetic field from axial end portions of the magnetoelastic band.

5. The method of fabricating a torque sensor comprising the steps of:
   a) imparting a first circumferential magnetic field within a magnetoelastic band having a first desired magnetic field direction;
   b) imparting a second circumferential magnetic field within the magnetoelastic band in a second desired magnetic field direction opposite the first magnetic field direction; and
   c) spacing the first magnetic field an axial distance from the second magnetic field, wherein the spacing between the first magnetic field and the second magnetic field imparts a magnetic remnant having a magnetic field orientation different than the first magnetic field direction and the second magnetic field direction and the magnetic remnant disposed between the first and second magnetic fields biases that portion of the magnetoelastic band toward a negative hysteresis.

6. The method as recited in claim 5, including the step of countering positive hysteresis produced within the torque transducer with the negative hysteresis imparted within the magnetoelastic band.

7. A method of reducing hysteresis in a magnetoelastic torque sensor comprising the steps of:
   a) imparting a first remnant magnetic field in a first circumferential direction within a ring of magnetoelastic material supported on a substrate;
   b) imparting a second remnant magnetic field in a second circumferential direction that is opposite to the first circumferential direction within the ring of magnetoelastic material;
   c) orientating placement of the first remnant magnetic field to the second magnetic field to impart regions within the magnetoelastic material with a third magnetic field of lesser magnitude than any of the first magnetic field and the second magnetic field; and
   d) spacing and second circumferential magnetic fields axially from axial ends of the ring of magnetoelastic material to impart the third magnetic field at distal axial portions of the ring of magnetoelastic material.

8. The method as recited in claim 7, wherein the third magnetic field includes an orientation different than either of the first circumferential direction and the second circumferential direction.

9. The method as recited in claim 8, including the step of spacing the first remnant magnetic field axially apart from the second remnant magnetic field to form the third remnant magnetic field in a space therebetween.

10. The method as recited in claim 8, including the step of spacing the first and second circumferential magnetic fields axially from axial ends of the ring of magnetoelastic material to impart the third magnetic field at distal axial portions of the ring of magnetoelastic material.

11. The method as recited in claim 7, wherein said third magnetic field is generated responsive to generation of the first circumferential magnetic field and the second circumferential magnetic field.

12. The method as recited in claim 7, wherein the first and second circumferential magnetic fields are imparted with a permanent magnet of a power capable of magnetically saturating the magnetoelastic material.

13. A torque sensor assembly with reduced hysteresis comprising:

a substrate for receiving an applied torque; and a magnetoelastic ring supported on the substrate, wherein said magnetoelastic ring includes a first magnetic remnant region having a first circumferential orientation, a second magnetic remnant region having a second circumferential orientation opposite to the first circumferential orientation, and a third magnetic remnant region having an third orientation different than the first and second circumferential orientations, wherein the first and second magnetic remnant regions are spaced apart from axial ends of the magnetoelastic ring, and the third magnetic remnant region is disposed between each of the first and second magnetic remnant regions and each axial end.

14. The assembly as recited in claim 13, wherein the first and second magnetic remnant regions are formed by the application of a magnetic field of such a magnitude to magnetically saturate the material comprising the magnetoelastic ring and the third magnetic remnant region if formed by the interaction between the first and second magnetic remnant regions.

\* \* \* \* \*